(12) United States Patent
Li

(10) Patent No.: US 9,639,791 B2
(45) Date of Patent: May 2, 2017

(54) COLOR REGISTRATION ERROR COMPENSATION IN COLOR PRINTING

(71) Applicant: Xerox Corporation, Norwalk, CT (US)

(72) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 351 days.

(21) Appl. No.: 13/900,828

(22) Filed: May 23, 2013

(65) Prior Publication Data

US 2014/0347700 A1    Nov. 27, 2014

(51) Int. Cl.
*G06K 15/02*        (2006.01)

(52) U.S. Cl.
CPC ................... *G06K 15/188* (2013.01)

(58) Field of Classification Search
None
See application file for complete search history.

(56) References Cited

U.S. PATENT DOCUMENTS

| 2004/0135845 A1* | 7/2004 | Mantell | B41J 2/2132 347/43 |
| 2007/0236740 A1* | 10/2007 | Yao | H04N 1/58 358/3.06 |

\* cited by examiner

*Primary Examiner* — Andrew H Lam
(74) *Attorney, Agent, or Firm* — Gibb & Riley, LLC

(57) ABSTRACT

A multicolor image can include multiple overlaid items including a black region covering a color region. Raster image processing adds the color data to color pixels of the raster data print page uniformly across the area of the raster data print page that corresponds to the color region of the multicolor image, and adds the black data to over-print pixels (where the black region covers the color region in the multicolor image). Such over-print pixels include both the color data and the black data. The color data (but not the black data) is removed from the over-print pixels that are positioned a preset pixel distance from non-black color pixels. The raster data page is output from the processor device to a printing engine, and the printing device prints the raster data page on print media to produce a physically printed reproduction of the multicolor image.

20 Claims, 14 Drawing Sheets

COLOR REGISTRATION ERROR COMPENSATION IN COLOR PRINTING

BACKGROUND

Systems and methods herein generally relate to printing devices and methods that process images into pixels for printing purposes, and more particularly to methods and systems that control registration errors between different regions of an image.

Printing errors sometimes occur when different colors are not properly aligned on a sheet of media that can result in gaps between colors, which can cause undesirable white spaces or artifacts to appear on the printed image. Some solutions to such misregistration use a process known as trapping.

"Trapping" is a term which generically describes a hardware and/or software process used to compensate for the small amount that the paper tends to wander as it travels through a printing press. Trapping compensates for mechanical shifts or stretching of paper in the printing process and provides an overlap of colors to prevent unprinted paper from showing in the final printed product. Trapping helps preserve the integrity or the shape of an image. Without trapping unsightly gaps are likely to appear between two colors that are supposed to be touching. With trapping, one color is made to overlap the other by extending that color into a surrounding area. This allows the colors to keep touching one another, even as the paper wanders. In simple trapping, where two colors are involved, the submissive color is spread into the dominant color.

Another process used to compensate for color registration errors in printing which is referred to as "black over-print" is sometimes used. Black over-print changes the behavior of renderings, such as PostScript® (PS) renderings (PostScript® is a registered trademark of Adobe Systems, Inc., San Jose Calif.) so that the rendered content under solid black color is not cut out. The over-print method at the PS interpreter level is done for all the area under the solid black color. More elaborate trapping methods have been developed to handle color registration errors, but due to the complexity of the algorithms, they may not be suitable for system with limited processing resources in the image path. Also, even with sophisticated schemes for trapping condition detection and trapping pixel placement calculation, errors can still happen, which may lead to artifacts.

SUMMARY

Exemplary methods herein receiving print data to print a multicolor image into a device, such as a raster image processor device or a printing device. The multicolor image includes multiple overlaid items including a black region covering a non-black color region (for example, black printed lettering over a picture). The methods herein also perform raster image processing on the print data using a processor device within the printing device (or the specialized raster image processor device) to assign black data and color data to pixels of a raster data print page, which will eventually be sent to a printing engine.

More specifically, this raster image processing adds the color data to color pixels of the raster data print page uniformly across the area of the raster data print page that corresponds to the color region of the multicolor image. The process of adding color data can include halftone pixel assignment processing that adds the color data only to a percentage (below 100%) of all pixels within the color region, and leave the other pixels white (or other background color).

Similarly, such raster image processing adds the black data to "over-print pixels." Such over-print pixels are those color pixels that will be covered by the black region that is overlaid over the color region. Such over-print pixels will include both the color data and the black data (so long as they included color in the potentially used halftone processing, mentioned above). The over-print pixels are located in an over-print region of the raster data print page that corresponds to an area where the black region covers the color region in the multicolor image.

In addition, after the raster image processing, methods herein remove the color data from, and leave the black data in, the over-print pixels that are positioned more than a preset "pixel distance" from non-black color pixels. Stated more specifically, the methods herein remove color pixels under black that are not within a pre-determined distance from pixels that have "off" value in the black plane. Thus, such methods do not need to look at the color plane, and only look at the black plane in making a decision. The pixel distance is at least one pixel (in addition to the edge pixel) and is in a direction extending from each of the edge pixels toward the center of the over-print region. Further, the pixel distance can be different for different printing engines.

The modified raster data page can then be output from the processor device to a printing engine, and the printing device then prints the raster data page on print media to produce a physically printed reproduction of the multicolor image.

Devices herein include specialized raster image processing devices and generalized printing devices, each that have an input/output device that receives print data to print a multicolor image. The multicolor image again includes a black region covering a color region that is other than black in color. Such devices also include a processor device operatively (meaning directly or indirectly) connected to the input/output device. The processor device raster image processes (RIPs) the print data to assign black data and color data to pixels of a raster data print page that will eventually be sent to a print engine. The raster image processor or generalized processor device adds the color data to color pixels of the raster data print page uniformly across an area of the raster data print page corresponding to the color region of the multicolor image, and adds the black data to over-print pixels of the color pixels to include both the color data and the black data within at least one of the over-print pixels. The over-print pixels are again located in an over-print region of the raster data print page corresponding to an area where the black region covers the color region in the multicolor image.

Further, such devices remove the color data from, and leave the black data in, ones of the over-print pixels that are positioned more than a predetermined pixel distance from non-black color pixels. Stated more specifically, the devices herein remove color pixels under black that are not within a pre-determined distance from pixels that have "off" value in the black plane. Thus, such methods do not need to look at the color plane, and only look at the black plane in making a decision.

Devices herein can also include a printing engine operatively connected to the processor device. The processor device outputs the raster data page to the printing engine, and the printing engine prints the raster data page on print media to produce a physically printed reproduction of the multicolor image.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, numerous issues have arisen with respect to conventional solutions to color registration. Therefore, the systems and methods herein provide color registration error compensation by adding a post-processing (post-raster image processing) step to an image that has been rendered with black over-print. More specifically, the systems and methods herein remove color pixels under the solid black region and that are not within a pre-determined distance from edge pixels that have the "off" value in the black plane.

A raster image processor (RIP) is a component used in a printing system that produces a raster image also known as a bitmap. The bitmap is sent to a printing device for output. Raster image processing is the process that turns vector digital information into a high-resolution raster image. Exemplary raster images produced by systems and methods herein are illustrated in FIGS. 1-7.

Figure 1:
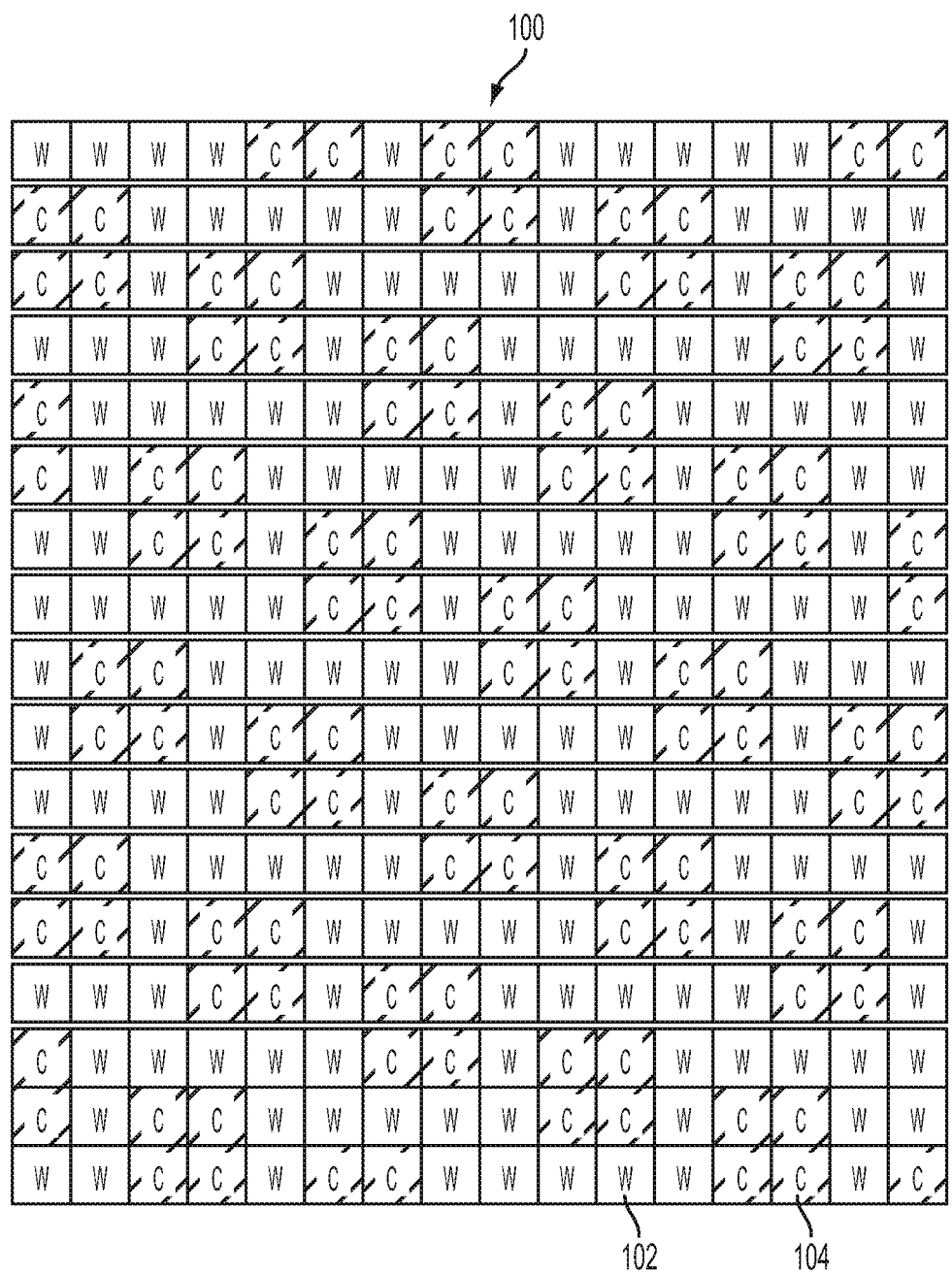
FIG. 1 is a schematic diagram illustrating pixels of portions of a raster image produced by systems and methods herein.

More specifically, FIG. 1 illustrates a very small portion 100 of the pixels within a much larger raster image output page. In FIG. 1, squares 102 containing a "W" represent white pixels where no marking material would be applied during the printing process. Here "white" or "W" is generically used to refer to the color of the print media where no marking material will be applied. Thus, white is used to generically represent the color of the printing media. Note that in the drawings, only a single pixel receives a numerical identifier in order to reduce clutter within the drawings; however, those ordinarily skilled in the art would understand that each numerical identifier represents all similar pixels.

Shaded squares 104 represent pixels where a marking material (such as cyan, thus the letter "C" appears in squares 104) would be placed during printing. Note that after printing the entire region 100 of the raster image presented in FIG. 1 would appear to the observer as a cyan printed region; however, only a limited number of pixels will actually receive cyan color marking material because the raster image processing that produced the bitmap shown in FIG. 1 utilized halftone printing processes (describe in greater detail below) to reduce costs and reduce consumption of printing materials.

Figure 2:
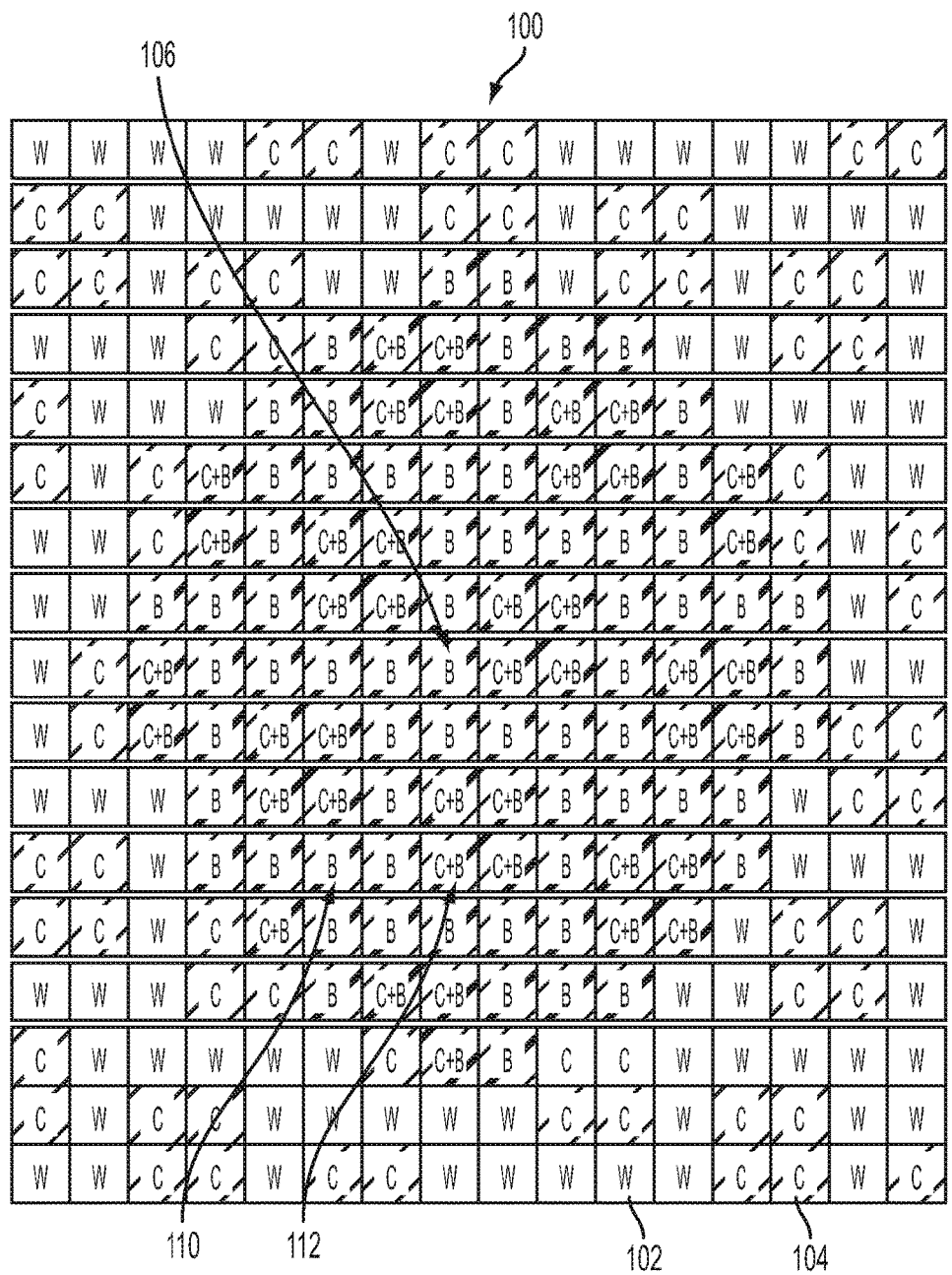
FIG. 2 is a schematic diagram illustrating pixels of portions of a raster image produced by systems and methods herein.

FIG. 2 illustrates black over-printing where black marking material is added to all pixels within a certain region 106. As contrasted with the halftone printing used for cyan in this example, the black over-printing is applied to every pixel within the black over-printing region 106 to form a "solid" black region. Note that the black over-printing process does not cancel the cyan from the pixels that were previously assigned to print cyan. Therefore, in FIG. 2, the pixels 110 within the black over-printing area which were previously designated with a "W" are now represented with a "B" because such pixels will print black marking material; and the pixels 112 which were previously designated with a "C" are now designated with a "C+B" because such pixels will print both cyan and black marking materials.

One problem with the black over-print process in pixels designated designated with a "C+B" is the amount of toner used, which could exceed the ink limit of the marking engine. Also, the color toner under solid black color may cause the area to have undesirable tint or gloss characteristics.

Figure 3:
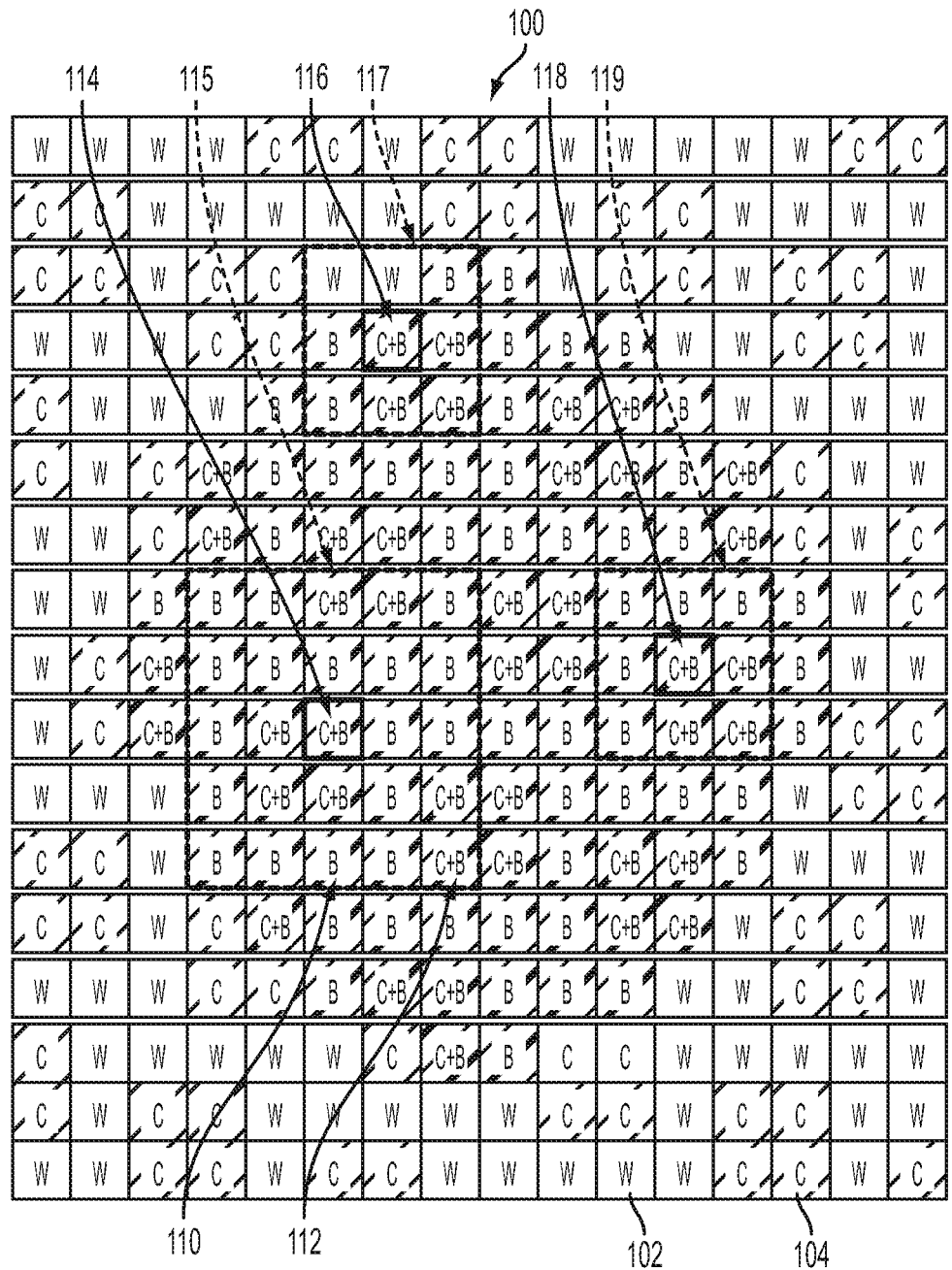
FIG. 3 is a schematic diagram illustrating pixels of portions of a raster image produced by systems and methods herein.

As shown in FIG. 3, after the raster image processing is complete, the methods herein move a window or kernel defining a neighborhood (shown as dashed lines 115, 117, and 119) through each and every color pixels under black. If in the defined neighborhood, as indicated by the dashed lines 115, 117, and 119, all pixels have black color "on" then the methods herein remove the color below the black color. Thus, the methods move through the black color region and check the area surrounding each over-print pixel to determine whether the surrounding area includes all black color pixels. If the surrounding area includes all black color pixels, the over-print pixel can be changed to a pixel that is black color only. Stated more specifically, the methods herein remove color pixels under black that are not within a pre-determined distance from pixels that have "off" value in the black plane. Thus, such methods do not need to look at the color plane, and only look at the black plane in making a decision.

More specifically, FIG. 3 illustrates a pixel 114 and a surrounding neighborhood (represented by dashed line 115). The distance from pixel 114 to the end of surrounding neighborhood 115 is defined herein as a "pixel distance." With methods and systems herein, the pixel distance can be set by the user (or can be automatically set) as discussed in greater detail below. However, here the pixel distance is at least 1 pixel (in addition to the pixel being analyzed 114).

In one example shown in FIG. 3, the pixel distance of the neighborhood 115 surrounding pixel 114 is 2 pixels. Note that all pixels within the pixel distance 115 have black color. Therefore, pixel 114 can be changed to only black color (have the cyan removed).

In another example, if the pixel distance being used is 1 pixel, the pixel distance around pixel 116 would be represented by the dashed lines 117; and in the same example, the pixel distance around pixel 118 would be the dashed lines 119. Note that within 1 pixel distance 117 of pixel 116, some of the pixels are non-black (represented by W). Therefore, according to methods and systems herein, pixel 116 will remain as an over-print pixel containing both cyan and black colors. To the contrary, within 1 pixel distance 119 of pixel 118, all pixels have black color; therefore, pixel 118 will have the cyan removed by the systems and methods herein leaving pixel 118 with only black color.

Note that either the pixel distance of 1 pixel (117 and 119) or the pixel distance of 2 pixels (115) would be used in any single analysis and different pixel distances would not be used in the same analysis; however, to allow an easy comparison to be made, the two different pixel distances have both been included in FIG. 3. Therefore, when the systems and methods herein remove non-black colors from some of the over-print pixels, only a single pixel distance is utilized. This pixel distance can be changed for different images that are analyzed.

Figure 4:
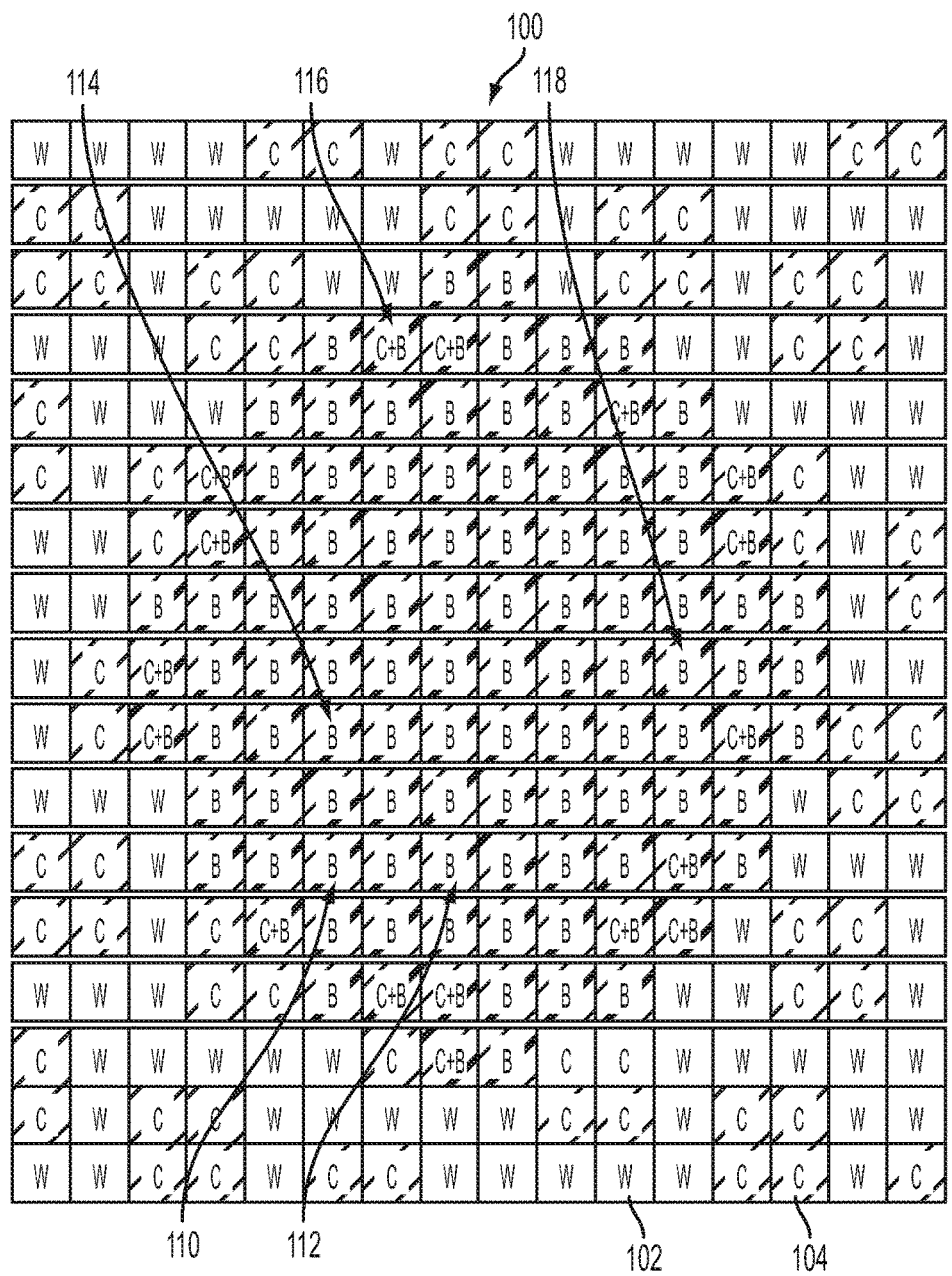
FIG. 4 is a schematic diagram illustrating pixels of portions of a raster image produced by systems and methods herein.

FIG. 4 represents processing after some of the over-print pixels have been changed to black color only using a pixel distance of 1 pixel. As shown in FIG. 4, while pixels 114 and 118 have been changed to black color only, pixel 116 remains as and over-print pixel containing both cyan color and black color (because some of the pixels 1 pixel distance away from pixel 116 are non-black).

Figure 5:
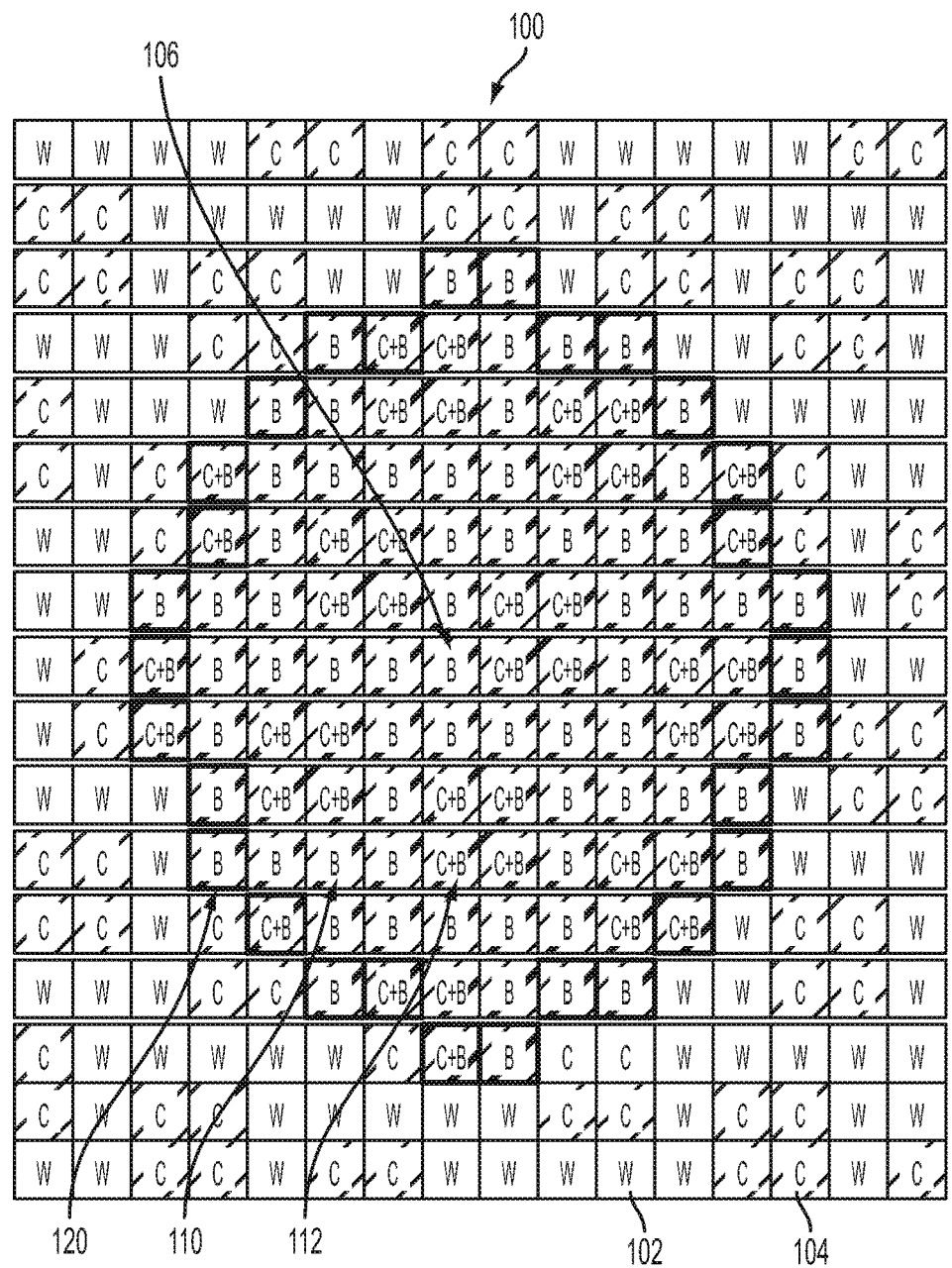
FIG. 5 is a schematic diagram illustrating pixels of portions of a raster image produced by systems and methods herein.

In an alternative processing, as shown in FIG. 5, after the raster image processing is complete, the systems and methods herein identify the pixels 120 that lie along the border of the solid black region 106. In FIG. 5, the squares that represent these pixels are provided with darker lines relative to other squares within FIG. 5. These pixels 120 are sometimes referred to as edge pixels that are positioned along the circumference of the over-print region 106.

Figure 6:
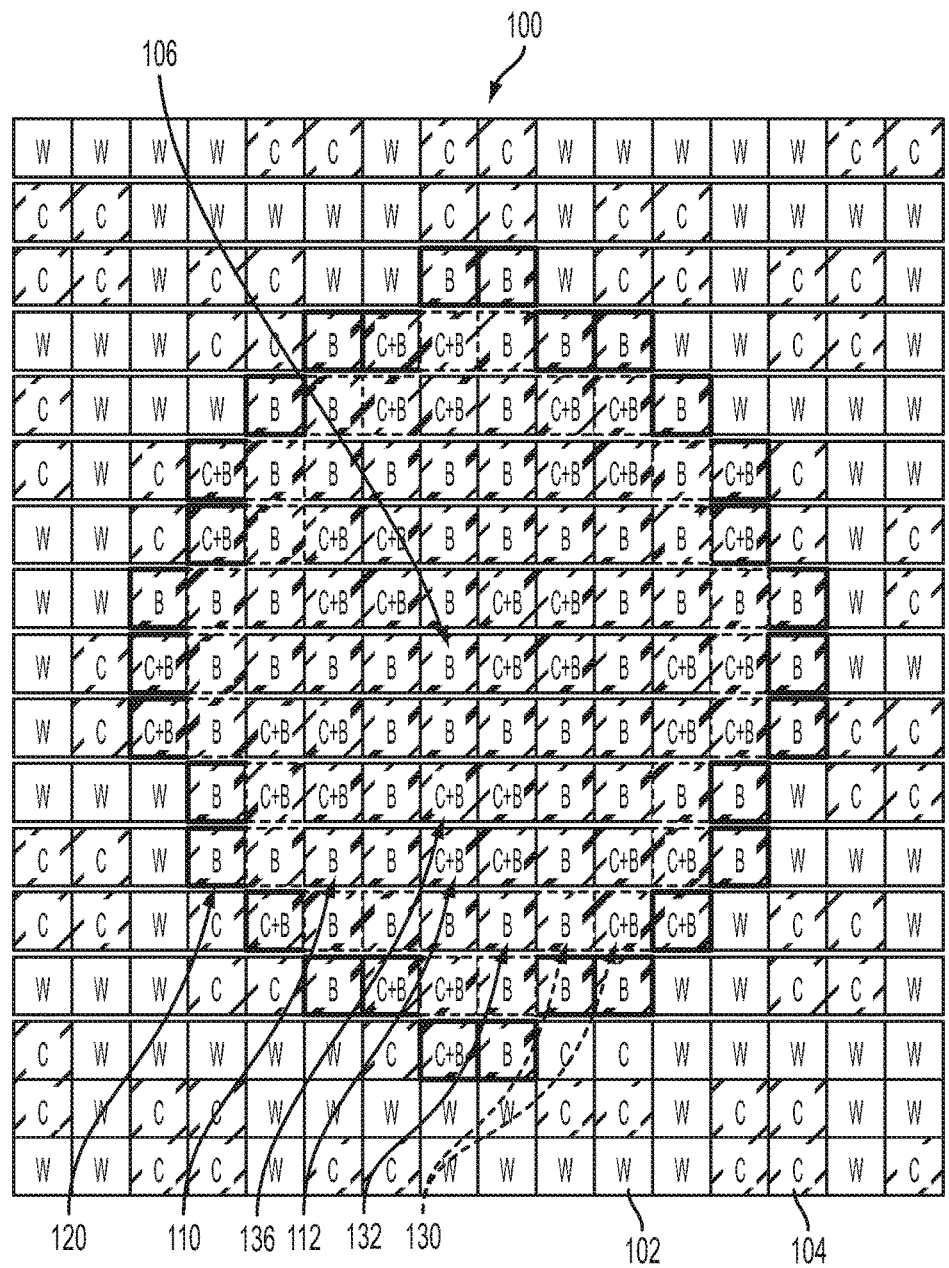
FIG. 6 is a schematic diagram illustrating pixels of portions of a raster image produced by systems and methods herein.
Figure 7:
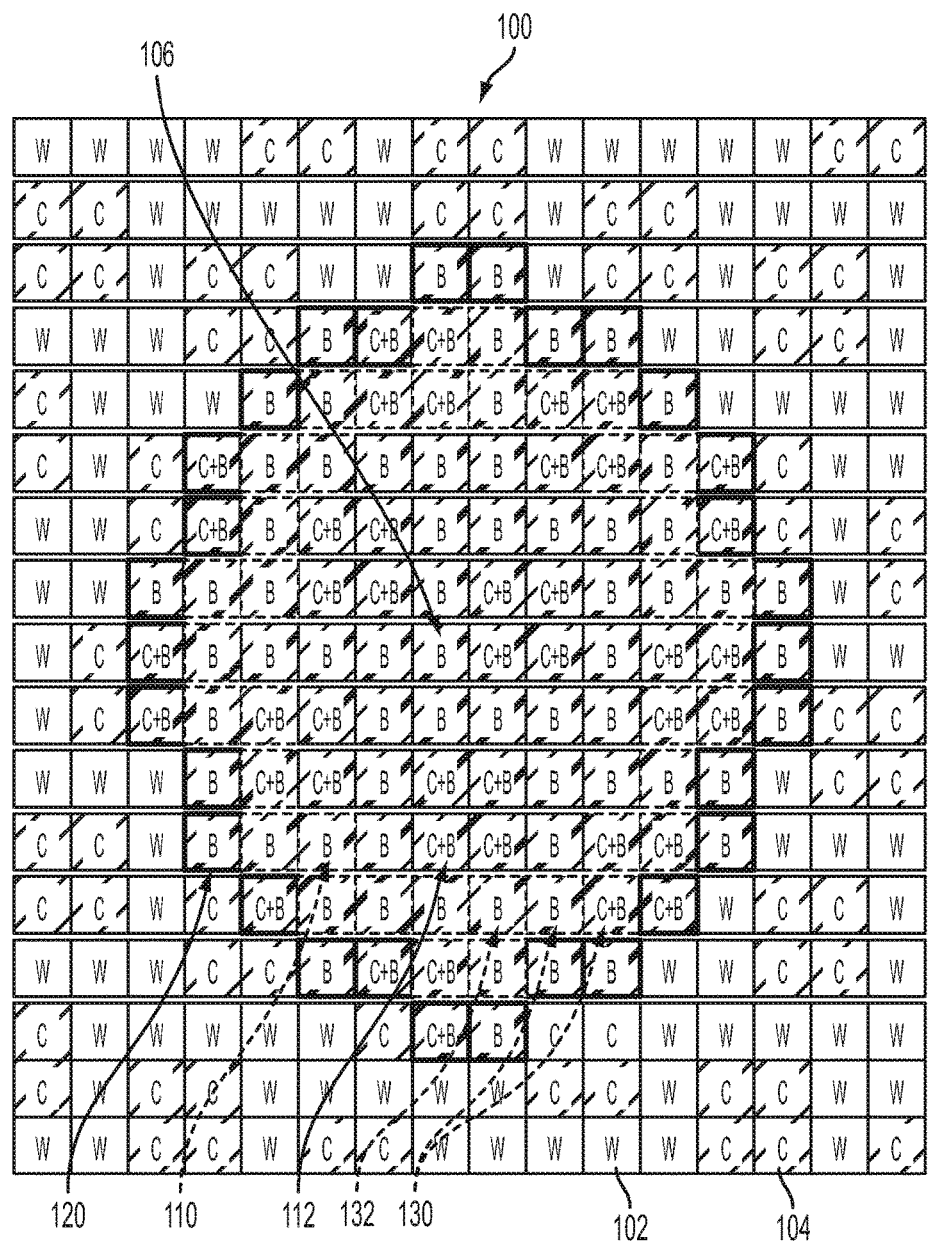
FIG. 7 is a schematic diagram illustrating pixels of portions of a raster image produced by systems and methods herein.

In FIG. 6, pixels 130 that are positioned a preset "pixel distance" from the edge pixels 120 are identified herein. The pixel distance is at least one pixel (in addition to the edge pixel 120) and is in a direction extending from each of the edge pixels 120 toward a center of the over-print region 106. Note that the pixels 130 in FIG. 6 are further distinguished from other pixels by using dashed lines for the squares representing pixels 130.

The pixel distance can be adjusted by the systems and methods herein to accommodate the restrictions of different printing devices and different printing situations. Further, as explained below, different processing will be applied to those pixels within the pixel distance; therefore, the number of pixels within the pixel distance can compensate for a printing system's inadequacies, or for special printing situations.

In the example shown in FIG. 6, the pixel distance is a single horizontal or vertical pixel. Therefore, each of pixels 130 within the pixel distance is immediately horizontally or vertically adjacent to an edge pixel 120; however, pixel 132 (which is only diagonally adjacent to an edge pixel 120) is not included within the pixel distance. To the contrary, in FIG. 7, the pixel distance is defined to be a single horizontal, vertical, or diagonal pixel from an edge pixel 120. Therefore, in FIG. 7, pixel 132 (in addition to pixels 130) is included within the pixel distance.

Figure 8:
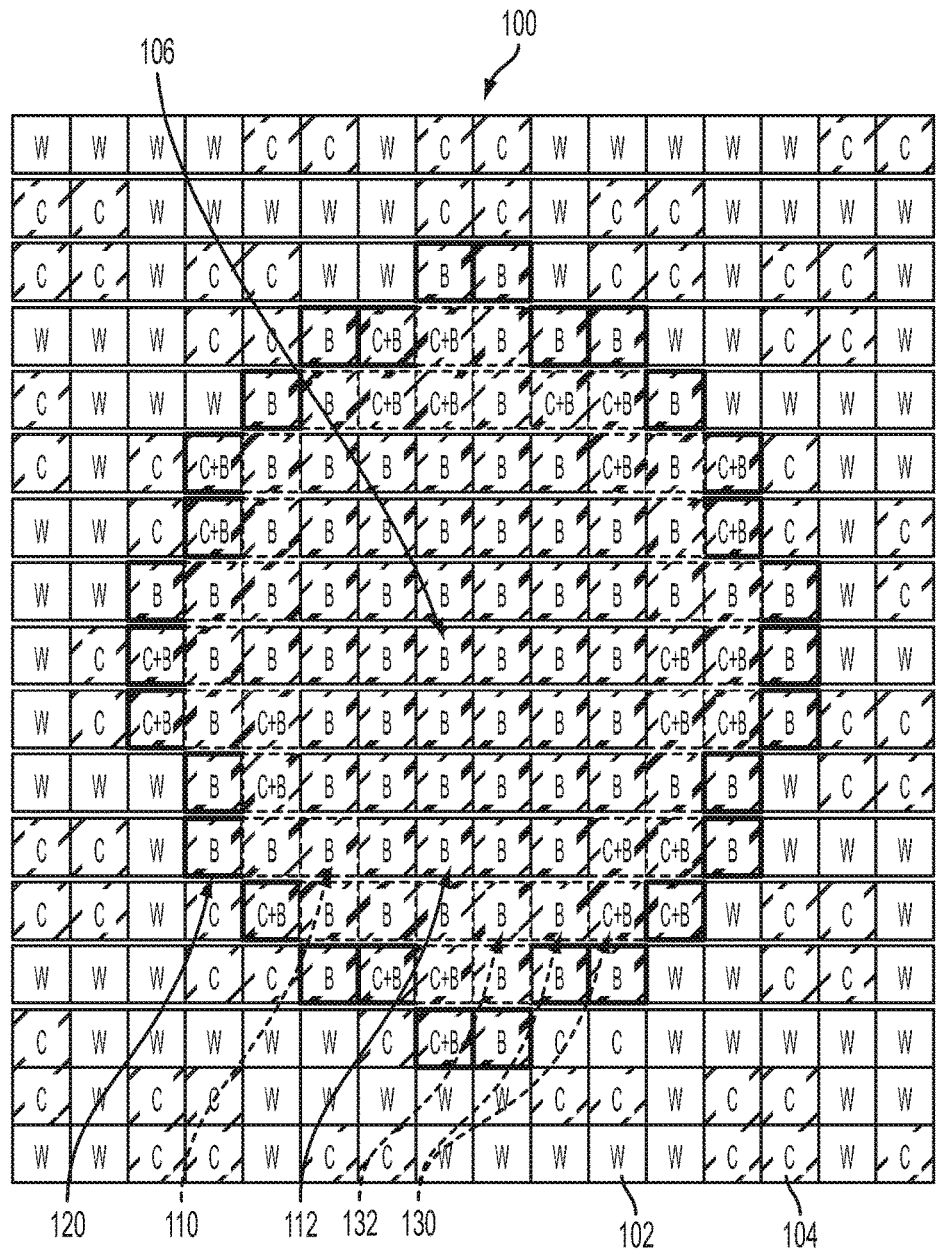
FIG. 8 is a schematic diagram illustrating pixels of portions of a raster image produced by systems and methods herein.

As shown in FIG. 8, the systems and methods herein then remove the color data (cyan) from, and leave the black data in, the over-print pixels that are positioned more than a preset "pixel distance" from the edge pixels. More specifically, FIG. 8 illustrates processing continuing the example of that shown in FIG. 7 having the pixel distance be a single horizontal, vertical, or diagonal pixel from an edge pixel 120 (as represented by the dashed-line squares in FIG. 8). As also shown in FIG. 8, all pixels that are positioned more than the pixel distance from an edge pixel only contain black data ("B"). This change can be seen by observing the change that occurred in pixel 112 in FIGS. 5 and 6 (from "C+B" to "B"); while pixels 130 that are not more than the pixel distance from an edge pixel 120 are not changed between FIGS. 5 and 6. Again, pixels 130 are not changed between FIGS. 5 and 6 because they are within the "pixel distance" (are not more than the pixel distance from an edge pixel 120), while pixels outside the pixel distance will be changed to just black color data.

Figure 9:
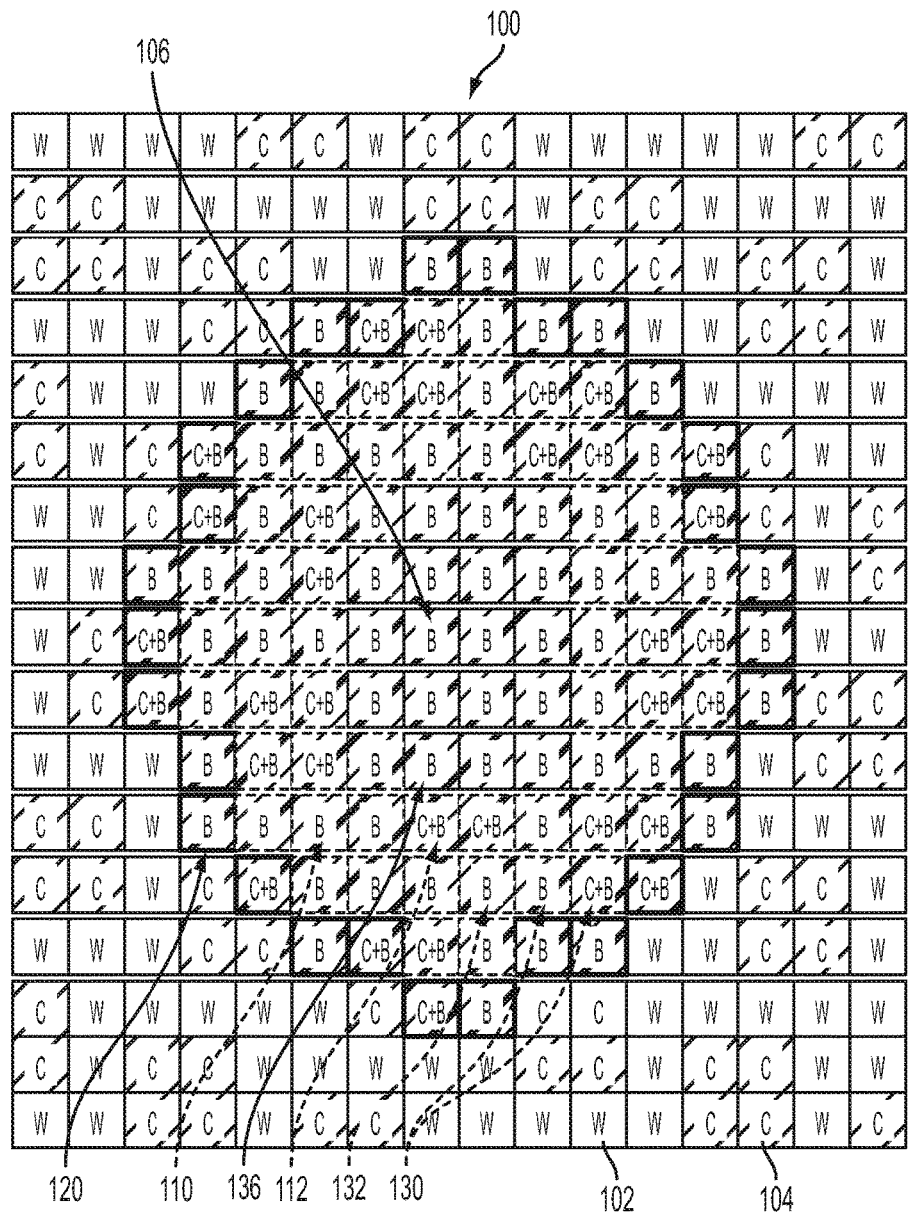
FIG. 9 is a schematic diagram illustrating pixels of portions of a raster image produced by systems and methods herein.

FIG. 9 illustrates another example after removal of the non-black color data where the pixel distance is two horizontal, vertical, or diagonal pixels from an edge pixel 120. The change caused by removing the non-black color data in the example illustrated FIG. 9 can be seen by comparing pixel 136 in FIG. 9 with the corresponding pixel and FIG. 6, which changed from "C+B" to "B." Note that the pixel distance can be any number of pixels, can be horizontal only, vertical only, diagonal only, or any combination of horizontal, vertical, and/or diagonal. Different pixel distances will cause different effects within different machines (and in different printing situations). Therefore, the systems and methods herein adjust the pixel distance to match the specific printing machine and specific printing situation so as to avoid white spaces, as well as avoid excessive use of marketing material, gloss effects, or other undesirable printing anomalies.

Figure 10A:
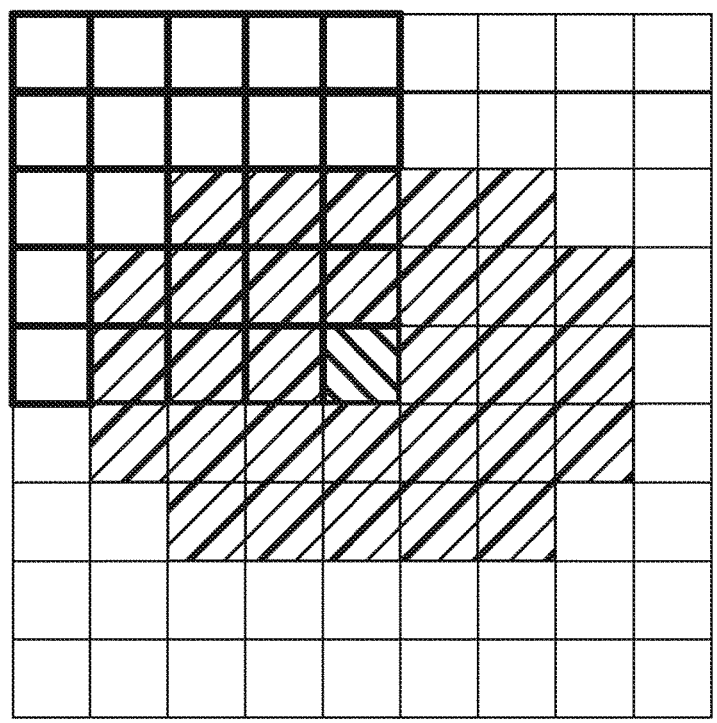
FIGS. 10A and 10B are schematic diagrams illustrating pixels of portions of a raster image produced by systems and methods herein.
Figure 10B:
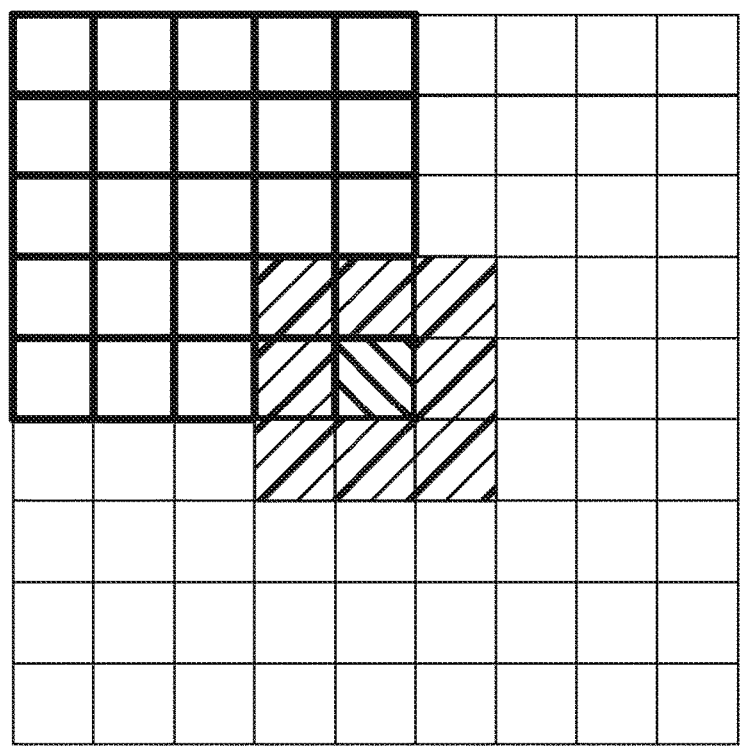

Regarding the pixel distance that is mentioned herein, FIGS. 10A and 10B show an exemplary scheme used for under-K color pixel removal. For a color plane such as the magenta plane, the current pixel of interest will be turned "off" if there is no "on" pixels in the black plane that are close to the current pixel of interest. Thus, FIGS. 10A and 10B show a neighborhood that is defined within a 9×9 window centered on the current pixel of interest (shown in black). The neighborhood is specified by processes, which can contain, for example, five 5-bit registers. The registers can specify symmetrical neighborhood shapes such as the ones shown in grey in FIGS. 10A and 10B. If the neighborhood of the current pixel of interest (shown in black in FIGS. 10A and 10B) has all black pixels on (the neighborhood is the grey colored region in FIGS. 10A and 10B; and FIGS. 10A and 10B illustrate two examples of a neighborhood). The color of the current pixel of interest will be removed (as it is in the interior of a black region). On the other hand, if not all pixels in the neighborhood have black "on", this means that the color pixel being examined is close to the edge (of the black content) so the methods and devices herein do not remove it.

As shown above, the systems and methods herein are not only simple and inexpensive to implement, but also robust. The systems and methods herein can be used whenever the page description language (PDL) processor has the capability to render the page using the black over-print feature. The systems and methods herein over-print the black and color in the raster image processor (RIP), and then use window across color planes to zero out color pixels under the black that are a sufficient pixel distance from an edge. The systems and methods herein are especially useful for low cost printer products that do not use complicated trapping methods. In addition, because the systems and methods herein remove the non-black color data from the black over-print region after raster image processing has been completed, older or simpler devices can be easily retrofitted by adding the systems and methods herein to existing raster image processors (or to existing raster image processor designs) without having to modify the raster image processing of the existing systems or designs.

Figure 11:
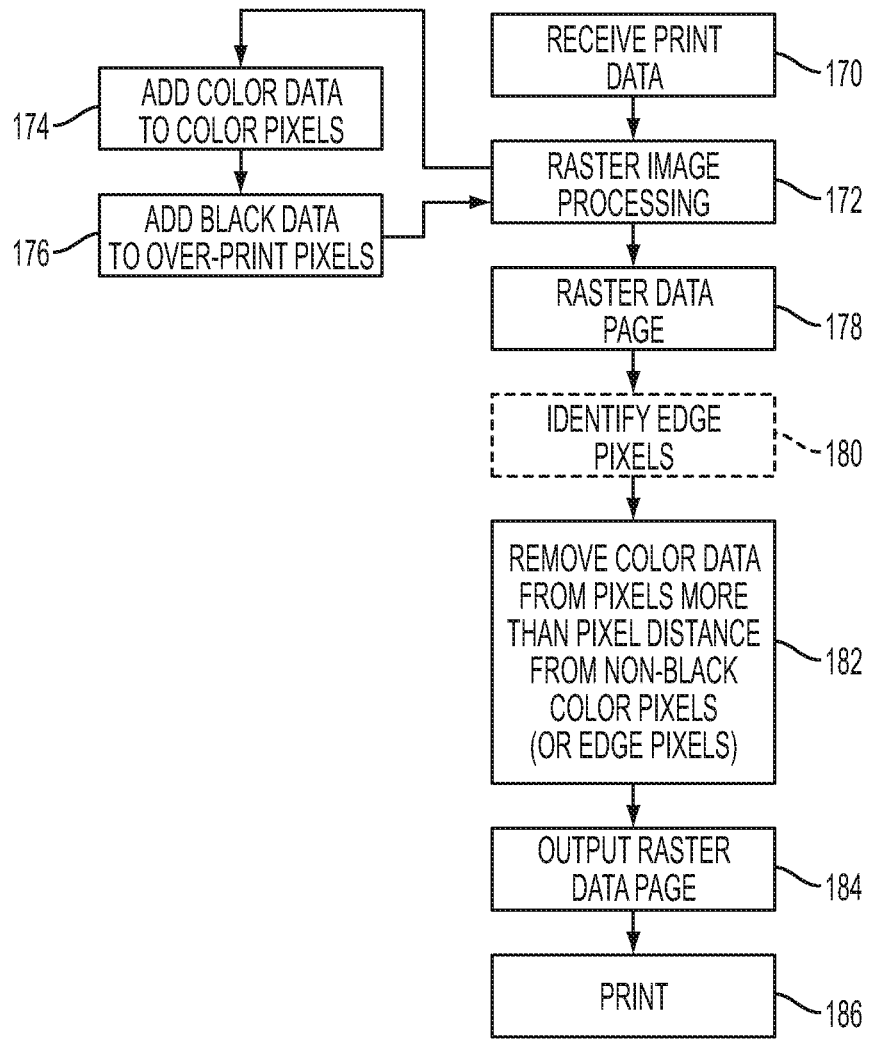
FIG. 11 is a flow diagram of various methods herein.

FIG. 11 is flowchart illustrating exemplary methods herein. In item 170, these methods receive print data to print a multicolor image into a device, such as a raster image processor device or a printing device. The multicolor image includes multiple overlaid items including a black region covering a non-black color region (for example, black printed lettering over a picture). In item 172, these methods herein also perform raster image processing on the print data using a processor device within the printing device (or the specialized raster image processor device) to assign black data and color data to pixels of a raster data print page, which will eventually be sent to a printing engine. While colors are sometimes referred to as being "added to" or "assigned to" pixels, those ordinarily skilled in the art would understand that the various colors are turned on or turned off to eventually make the bitmap that will be used by the printing engine.

More specifically, as shown in item 174, this raster image processing adds the color data to color pixels of the raster data print page uniformly across the area of the raster data print page that corresponds to the color region of the multicolor image. The process of adding color data can include halftone pixel assignment processing that adds the color data only to a percentage (below 100%) of all pixels within the color region, and leave the other pixels white (or other background color).

Similarly, such raster image processing adds the black data to "over-print pixels" in item 176. Such over-print pixels are those color pixels that will be covered by the black region that is overlaid over the color region. Such over-print pixels will include both the color data and the black data (so long as they included color in the potentially used halftone processing, mentioned above). The over-print pixels are located in an over-print region of the raster data print page that corresponds to an area where the black region covers the color region in the multicolor image. This raster image processing produces a page of raster data, as shown in item 178.

After completing the black over-print raster processing, the methods herein perform post-raster image processing steps including optional item 180 (which is shown using dashed lines to show it is optional) where these methods identify edge pixels that are positioned along a circumference of the over-print region. In item 182, these methods remove the color data from, and leave the black data in, the over-print pixels that are positioned more than a preset "pixel distance" from non-black pixels (as shown in FIGS. 3 and 4) or from the edge pixels (as shown in FIGS. 5-8). The pixel distance is at least one pixel (in addition to the edge pixel) and is in a direction extending from each of the edge pixels toward a center (center line, center region, center area, etc.) of the black over-print region. Further, the pixel distance can be different for different printing engines.

The methods then output the modified raster page data from the processor device to a printing engine in item 184, and the printing device then prints the raster data page on print media to produce a physically printed reproduction of the multicolor image in item 186.

Figure 12:
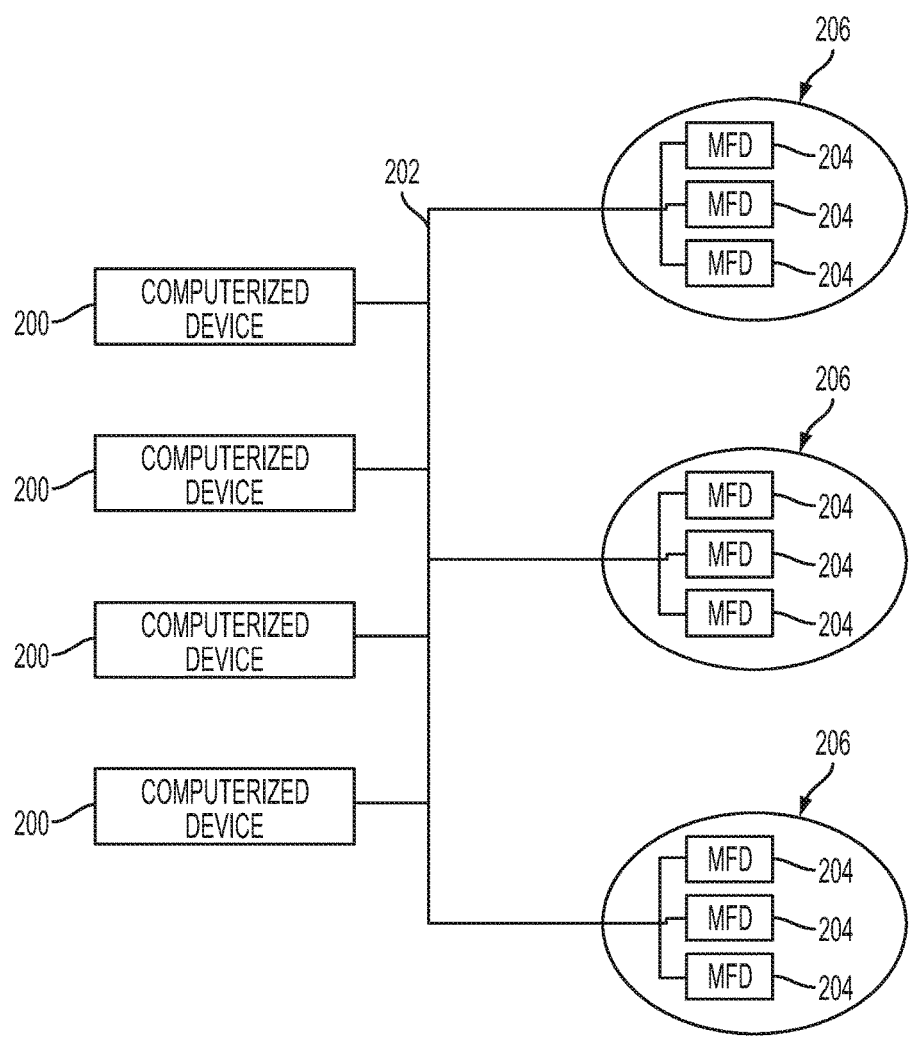
FIG. 12 is a schematic diagram illustrating systems herein.

As shown in FIG. 12, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. The processing discussed above (such as the raster image processing) can be performed at any location within the exemplary system shown in FIG. 12.

Figure 13:
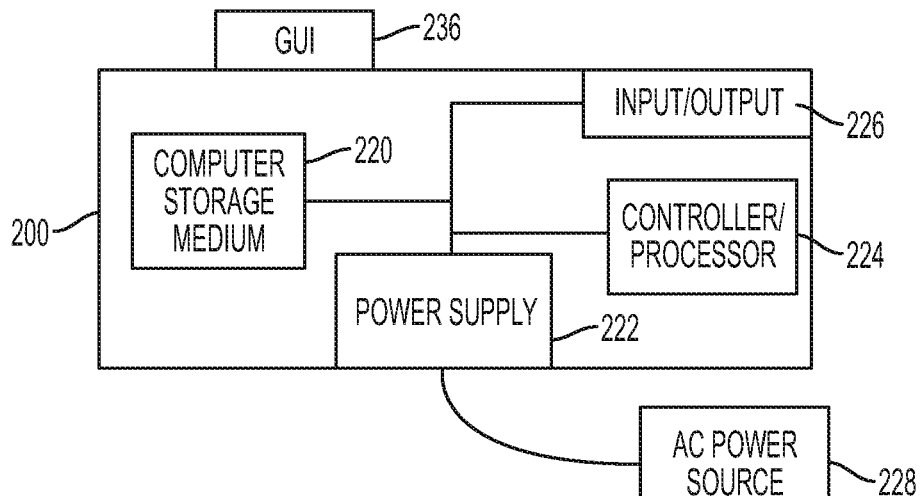
FIG. 13 is a schematic diagram illustrating devices herein.

FIG. 13 illustrates details of one of the computerized devices 200 shown in FIG. 12, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 13, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 14:
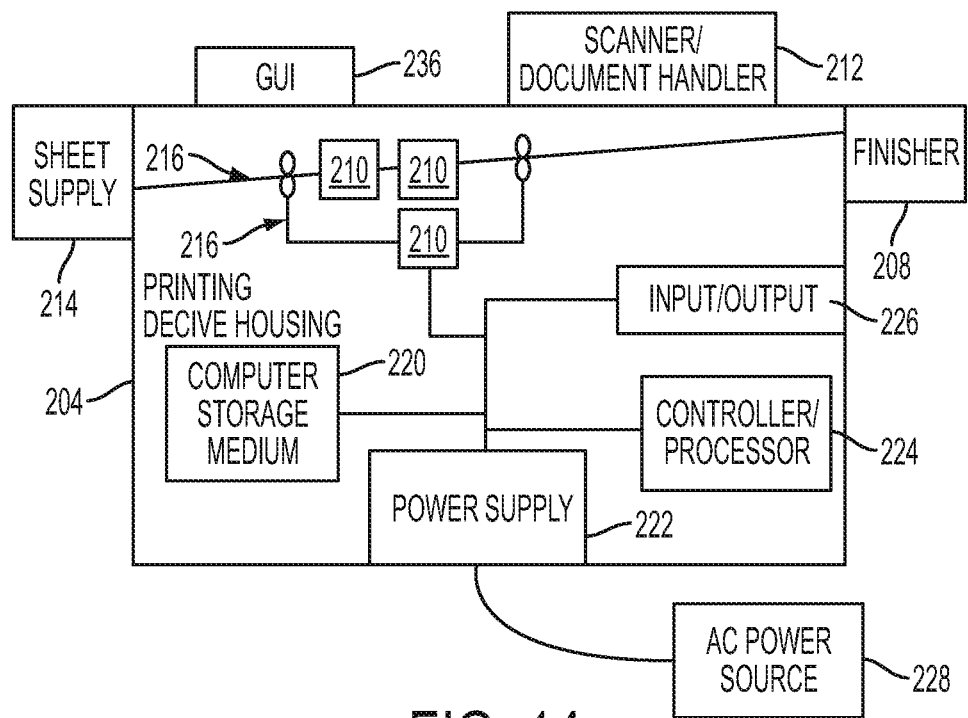
FIG. 14 is a schematic diagram illustrating devices herein.

FIG. 14 illustrates details of one of the devices shown in FIG. 13 that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Devices herein 200, 204 include specialized raster image processing devices and generalized printing device that have an input/output device 226 that receives print data to print a multicolor image. The multicolor image again includes a black region covering a color region, which is other than black in color. Such devices also include a processor device 224 operatively (meaning directly or indirectly) connected to the input/output device 226. The processor device 224 raster image processes (RIPs) the print data to assign black data and color data to pixels of a raster data print page that will eventually be sent to a print engine.

The raster image processor or generalized processor device 224 adds the color data to color pixels of the raster data print page uniformly across an area of the raster data print page corresponding to the color region of the multicolor image, and adds the black data to over-print pixels of the color pixels to include both the color data and the black data within at least one of the over-print pixels. The over-print pixels are again located in an over-print region of the raster data print page corresponding to an area where the black region covers the color region in the multicolor image. Further, in a post-raster image processing step, such devices identify edge pixels that are positioned along a circumference of the over-print region, and remove the color data, and leave the black data in, ones of the over-print pixels that are positioned more than a predetermined pixel distance from the edge pixels.

Devices herein 200, 204 can also include a printing engine 210 operatively connected to the processor device 224. The processor device 224 outputs the raster data page to the printing engine 210, and the printing engine 210 prints the raster data page on print media to produce a physically printed reproduction of the multicolor image.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A pixel refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A raster image processing device comprising:
    an input/output device receiving print data to print a multicolor image, said multicolor image including a black region covering a color region; and
    a processor device operatively connected to said input/output device, said processor device raster image processing said print data to assign black data and color data to pixels of a raster data page, said raster image processing comprising said processor device:
        adding said color data to color pixels of said raster data page uniformly across an area of said raster data page corresponding to said color region of said multicolor image; and
        adding said black data to over-print pixels of said color pixels to include both said color data and said black data within at least one of said over-print pixels, said over-print pixels being located in an over-print region of said raster data page corresponding to an area where said black region covers said color region in said multicolor image; and
    after said raster image processing, said processor device removing said color data from, and leaving said black data in, ones of said over-print pixels that are positioned more than a pixel distance from non-black color pixels in said raster data page to produce a print page, using said processor, edge pixels being positioned along a circumference of said over-print region, and said pixel distance comprising at least one pixel in a direction from each of said edge pixels toward a center of said over-print region, and
    said processor device outputting said print page to a printing engine through said input/output device.

2. The raster image processing device according to claim 1, said pixel distance being different for different printing engines.

3. The raster image processing device according to claim 1, said adding said color data to color pixels uniformly across said color region comprising halftone pixel assignment processing that adds said color data to a percentage of all pixels within said color region.

4. The raster image processing device according to claim 3, said over-print pixels that include both said color data and said black data comprising said percentage of all said pixels within said color region to which said color data is added.

5. The raster image processing device according to claim 1, said color data comprising colors other than black.

6. A printing device comprising:
    an input/output device receiving print data to print a multicolor image, said multicolor image including a black region covering a color region;
    a processor device operatively connected to said input/output device; and
    a printing engine operatively connected to said processor device,
    said processor device raster image processing said print data to assign black data and color data to pixels of a raster data page, said raster image processing comprising said processor device:
        adding said color data to color pixels of said raster data page uniformly across an area of said raster data page corresponding to said color region of said multicolor image; and
        adding said black data to over-print pixels of said color pixels to include both said color data and said black data within at least one of said over-print pixels, said over-print pixels being located in an over-print region of said raster data page corresponding to an area where said black region covers said color region in said multicolor image,
    after said raster image processing, said processor device removing said color data from, and leaving said black data in, ones of said over-print pixels that are positioned more than a pixel distance from non-black color pixels in said raster data page to produce a print page, edge pixels being positioned along a circumference of said over-print region, and said pixel distance comprising at least one pixel in a direction from each of said edge pixels toward a center of said over-print region,
    said processor device outputting said print page to said printing engine, and
    said printing engine printing said print page on print media to produce a physically printed reproduction of said multicolor image.

7. The printing device according to claim 6, said pixel distance being different for different printing engines.

8. The printing device according to claim 6, said adding said color data to color pixels uniformly across said color region comprising halftone pixel assignment processing that adds said color data to a percentage of all pixels within said color region.

9. The printing device according to claim 8, said over-print pixels that include both said color data and said black data comprising said percentage of all said pixels within said color region to which said color data is added.

10. The printing device according to claim 6, said color data comprising colors other than black.

11. A method comprising:
    receiving print data to print a multicolor image into a processor device, said multicolor image including a black region covering a color region;
    raster image processing said print data using said processor device to assign black data and color data to pixels of a raster data page, said raster image processing comprising:

adding said color data to color pixels of said raster data page uniformly across an area of said raster data page corresponding to said color region of said multicolor image; and adding said black data to over-print pixels of said color pixels to include both said color data and said black data within at least one of said over-print pixels, said over-print pixels being located in an over-print region of said raster data page corresponding to an area where said black region covers said color region in said multicolor image;

after said raster image processing, removing said color data from, and leaving said black data in, ones of said over-print pixels that are positioned more than a pixel distance from non-black color pixels, using said processor device in said raster data page to produce a print page, edge pixels being positioned along a circumference of said over-print region, and said pixel distance comprising at least one pixel in a direction from each of said edge pixels toward a center of said over-print region; and outputting said print page from said processor device to a printing engine.

12. The method according to claim 11, said pixel distance being different for different printing engines.

13. The method according to claim 11, said adding said color data to color pixels uniformly across said color region comprising halftone pixel assignment processing that adds said color data to a percentage of all pixels within said color region.

14. The method according to claim 13, said over-print pixels that include both said color data and said black data comprising said percentage of all said pixels within said color region to which said color data is added.

15. The method according to claim 11, said color data comprising colors other than black.

16. A method comprising:

receiving print data to print a multicolor image into a printing device, said multicolor image including a black region covering a color region;

raster image processing said print data using a processor device within said printing device to assign black data and color data to pixels of a raster data page, said raster image processing comprising:

adding said color data to color pixels of said raster data page uniformly across an area of said raster data page corresponding to said color region of said multicolor image; and adding said black data to over-print pixels of said color pixels to include both said color data and said black data within at least one of said over-print pixels, said over-print pixels being located in an over-print region of said raster data page corresponding to an area where said black region covers said color region in said multicolor image;

after said raster image processing, removing said color data from, and leaving said black data in, ones of said over-print pixels that are positioned more than a pixel distance from non-black color pixels in said raster data page to produce a print page, using said processor device edge pixels being positioned along a circumference of said over-print region, and said pixel distance comprising at least one pixel in a direction from each of said edge pixels toward a center of said over-print region;

outputting said print page from said processor device to a printing engine within said printing device; and printing said print page on print media using said printing engine to produce a physically printed reproduction of said multicolor image.

17. The method according to claim 16, said pixel distance being different for different printing engines.

18. The method according to claim 16, said adding said color data to color pixels uniformly across said color region comprising halftone pixel assignment processing that adds said color data to a percentage of all pixels within said color region.

19. The method according to claim 18, said over-print pixels that include both said color data and said black data comprising said percentage of all said pixels within said color region to which said color data is added.

20. The method according to claim 16, said color data comprising colors other than black.

* * * * *